United States Patent [19]

Inoue et al.

[11] Patent Number: 4,680,278

[45] Date of Patent: Jul. 14, 1987

[54] PROCESS FOR PREPARING ALUMINUM NITRIDE POWDER

[75] Inventors: Hiroshi Inoue, Kawaguchi; Akihiko Tsuge, Yokohama; Katsutoshi Komeya, Oiso, all of Japan

[73] Assignee: Kabushiki Kaisha Toshiba, Kawasaki, Japan

[21] Appl. No.: 812,012

[22] Filed: Dec. 23, 1985

[30] Foreign Application Priority Data

Dec. 24, 1984 [JP] Japan .................. 59-270950

[51] Int. Cl.$^4$ ............................................. C04B 35/58
[52] U.S. Cl. ..................................... 501/98; 264/122; 423/412; 501/92; 501/100
[58] Field of Search .......................... 501/100, 92, 98; 264/122; 423/412

[56] References Cited

U.S. PATENT DOCUMENTS 4,354,991 10/1982 Suzuki et al. ..................... 501/89
4,499,193 2/1985 Phelps et al. ..................... 501/97
4,511,666 4/1985 Phelps et al. ..................... 501/98

Primary Examiner—Stephen J. Lechert, Jr.
Attorney, Agent, or Firm—Schwartz, Jeffery, Schwaab, Mack, Blumenthal & Evans

[57] ABSTRACT

A process for preparing aluminum nitride powder, which comprises mixing (i) aluminum hydroxide powder, (ii) carbon powder or a substance capable of forming carbon powder by heating and (iii) at least one of additives selected from the group consisting of aluminum nitride powder, silicon nitride powder, silicon carbide powder and powder of substances capable of forming the powder corresponding to these powders, and baking the mixture thus obtained in a non-oxidative atmosphere containing nitrogen. The process is useful for preparing aluminum nitride powder having small particle size and small particle size distribution and also having a uniform shape of particles, at a lower temperature and in a shorter period of time.

8 Claims, No Drawings

PROCESS FOR PREPARING ALUMINUM NITRIDE POWDER

BACKGROUND OF THE INVENTION

This invention relates to a process for preparing aluminum nitride powder. More particularly, it relates to a process for preparing at a lower temperature and in a shorter period of time, aluminum nitride powder having small particle size and small particle size distribution and also having a uniform shape of particles.

An aluminum nitride sintered body is a material excellent in stability under high temperature and thermal conductivity. Therefore, its use has been developed as a useful high temperature material.

When the sintered body is prepared under the same conditions for molding and sintering, characteristics of the resultant sintered body is greatly affected by the particle size, the particle size distribution and the shape of particles of aluminum nitride powder to be used as starting material powder.

In general, the aluminum nitride powder is prepared by a method in which aluminum powder is directly nitrogenated or a method in which aluminum powder is reduced with carbon and then nitrogenated. In these methods, however, it is very difficult to prepare aluminum nitride powder having small particle size and small particle size distribution and also having a uniform shape of particles. Moreover, in the latter method, the synthesis reaction must be carried out at high temperature and over a long period of time because of the chemical stability of alumina, thereby involving a problem that makes the method industrially disadvantageous.

In order to solve such a problem, in particular, the problem in the latter method, a method has been proposed in which a starting material powder comprising a mixture of aluminum hydroxide powder and a carbonic substance is incorporated with one or more of compounds selected from the group consisting of fluorides, iron, magnesium oxides, calcium oxides, oxides of iron, oxides of nickel, oxides of cobalt, oxides of chromium, oxides of manganese, oxides of vanadium and oxides of niobium, and the resultant mixture is heated at 1300° to 1600° C. in a nitrogen atmosphere (see Japanese Patent Publication No. 51483/1984).

The above method surely makes it possible to carry out the synthesis reaction at a lower temperature. However, the resultant aluminum nitride powder can not be the one satisfying the small particle size, the small particle size distribution and the uniform shape of particles as aimed in this invention.

SUMMARY OF THE INVENTION

It is an object of this invention to provide a process for preparing aluminum nitride powder having small particle size and small particle size distribution and also having a uniform shape of particles, at a lower temperature and in a shorter period of time.

According to this invention, there is provided a process for preparing aluminum nitride powder, which comprises mixing (i) aluminum hydroxide powder, (ii) carbon powder or a substance capable of forming carbon powder by heating and (iii) at least one of additives selected from the group consisting of aluminum nitride powder, silicon nitride powder, silicon carbide powder and powder of substances capable of forming the powder corresponding to these powders, and baking the mixture thus obtained in a non-oxidative atmosphere containing nitrogen.

DESCRIPTION OF THE PREFERRED EMBODIMENTS

A first starting material powder of this invention is powder of aluminum hydroxide. In general, aluminum hydroxide starts a reaction to separate water at a temperature of about 200° C., which reaction becomes remarkable in the vicinity of 350° C., and, with further heating, it is finally converted to α-alumina via various phases of alumina. The process of this invention is a process utilizing the phenomenon that the phase conversion of aluminum hydroxide is in an active and unstable state during the course of conversion. Namely, it is a process in which the aluminum hydroxide which is in the course of conversion and therefore in the active state during the course of the baking, mentioned below, is reduced with the carbon powder also mentioned below, and further the additive is used as a "seed" so that fine aluminum nitride may be synthesized at the peripheral portion thereof, whereby it is made possible that the synthesis reaction is carried out at a lower temperature, and it is also made possible that the time required for the synthesis is shortened because the reaction rate also is high.

A second starting material powder is carbon powder or a compound capable of forming carbon powder when heated. Examples of the former may be carbon black, graphite, etc., and examples of the latter may be substances of various resin types. The latter materials may be transformed into carbon powder by the thermal decomposition during the course of baking. Such carbon powder reduces aluminum hydroxide or various kinds of alumina which are under course of the abovementioned conversion during the course of baking, and at the same time it may also act as a starting material for formation of silicon carbide which is one of the additives mentioned below.

A third starting material powder is an additive or additives comprising one or more of aluminum nitride powder, silicon nitride powder, silicon carbide powder and powder of substances capable of forming the powder corresponding to these powders. Of these additives, the substances capable of forming the above three powders may include, for example, aluminum, polycarbosilane, silicon nitrogen imide and silicon. These substances undergo thermal decomposition during the course of baking, and further reacts with nitrogen present in the baking atmosphere or with carbon powder mentioned above, whereupon they are transformed into the aluminum nitride powder, the silicon nitride powder or the silicon carbide powder. Functions of these additives are as mentioned above, provided that, when aluminum or silicon is used as an additive, the temperature at the baking must be controlled to a lower and constant level as compared with the case where the other additives are used, because they are low melting substances which are fused undesirably in the course of baking to make non-uniform the products as a whole.

It is preferred for these three starting material powders each to have the purity of 99% or more. The particle size thereof should be 20 to 1.0 $\mu$m, preferably 5 to 2 $\mu$m in respect of the first one; 0.5 $\mu$m or less, preferably 0.1 to 0.01 $\mu$m in respect of the second one; and 3.0 $\mu$m or less, preferably 1.5 to 0.8 $\mu$m in respect of the third one. These materials may be readily produced by a conventional industrial means.

In the process according to this invention, the first starting material powder and the second starting material powder are first mixed. At this time, carbon powder is mixed so as to be in an amount of 0.2 to 2 parts by weight, preferably 0.3 to 1 part by weight, based on 1 part by weight of aluminum hydroxide powder. If the mixing amount of the carbon powder is less than 0.2 part by weight, the amount of alumina or aluminum hydroxide to be remained in an unreacted state becomes large. If it is more than 2 parts by weight, it follows that the yield of aluminum nitride is lowered although the formation thereof is feasible.

Into the mixture of these, the third starting material, the additive(s), is then incorporated. It is incorporated in an amount of 0.005 to 1 part by weight, preferably 0.01 to 0.5 part by weight, based on 1 part by weight of aluminum hydroxide powder. If the amount of the additive(s) is less than 0.005 part by weight, the function as a "seed" during the course of baking becomes lowered. If it is more than 1 part by weight, the properties of the additive(s) remarkably appear in the resultant baked powder with the result that the property as aluminum nitride declines, whereupon it becomes difficult to achieve the object of the invention.

When the additives capable of forming aluminum nitride powder, silicon nitride powder or silicon carbide powder by heat treatment as used as starting material powder, they may be mixed in such an amount that the amounts of the respective products to be obtained as a result of heat treatment may satisfy each other the proportional conditions mentioned above.

In addition to the above first, second and third starting material powders, oxides of II A group metals including calcium oxide may also be used to promote the baking.

When carbon powder is incorporated in excess of its theoretical amount to aluminum hydroxide (about 0.22 part by weight based on 1 part by weight of aluminum hydroxide), unreacted carbon remains in the baked powder. In such a case, it may be removed by further baking the baked powder at a temprature of 600° to 800° C. in an oxidative atmosphere.

The respective starting material powders may be mixed by use of, e.g., a ball mill, etc.

The mixed powder obtained is baked in a non-oxidative atmosphere containing nitrogen. The atmosphere to be applied may include nitrogen gas, ammonia gas, nitrogen-argon mixed gas and hydrogen-nitrogen mixed gas, but preferred is nitrogen gas atmosphere from an industrial viewpoint.

The temperature for the baking ranges from 1300° to 1850° C., preferably from 1400° to 1600° C. If the temperature is lower than 1300° C., it is difficult to make formation of aluminum nitride powder. If it is higher than 1850° C., the particle size of the resultant aluminum nitride powder becomes undersirably large undesirably, and, when a silicon compound is used as the additive, the compound itself results in undergoing thermal decomposition. Baking time ranges from 2 to 20 hours, preferably from 5 to 10 hours.

This invention will be described in greater detail but by no means limited by the following Examples.

EXAMPLE 1

Mixed were 1 part by weight of aluminum hydroxide powder having a mean particle size of 10 μm, 0.4 part by weight of carbon black having a mean particle size of 0.05 μm and 0.1 part by weight of aluminum nitride powder having a mean particle size of 0.2 μm. 100 g of the mixture obtained was placed into a carbon container and baked at 1500° C. for 5 hours in a nitrogen stream of 10 lit./min.

The baked powder thus obtained was treated at 650° C. for 7 hours in air to remove remaining carbon by oxidation.

The powder obtained was analyzed by X-ray diffraction to confirm that the powder consisted almost entirely of aluminum nitride. Also, the baked powder was subjected to microscopic observation to find that the shape of particles was sufficiently uniform. Mean particle size, 0.6 μm. Particle size distribution, 1.2 to 0.4 μm. Results are shown in Table 1.

EXAMPLE 2

100 g of a powdery mixture comprising 1 part of weight of aluminum hydroxide powder having a mean particle size of 10 μm, 0.8 part by weight of carbon black having a mean particle size of 0.05 μm and 0.5 part by weight of silicon nitride powder having a mean particle size of 0.1 μm was baked at 1450° C. for 5 hours in a nitrogen stream of 10 lit./min.

The baked powder thus obtained was treated in the same manner as in Example 1 to remove carbon, and was analyzed by X-ray diffraction to confirm that the powder consisted of nitrogen-containing aluminum nitride.

Also, the microscopic observation revealed that the shape of particles was sufficiently uniform. Mean particle size, 0.5 μm. Particle size distribution, 1.1 to 0.4 μm. Results are shown in Table 1.

EXAMPLES 3 TO 8

The respective starting material powders (where the particle size of each material was the same as in Example 1 except that the particle size of silicon carbide was 0.08 μm) were mixed in the proportion as shown in Table 1, and baked under the conditions also shown therein. Each of the baked powder was treated at 750° C. for 5 hours in air to remove carbon. Results are shown together in Table 1.

COMPARATIVE EXAMPLES 1 TO 5

The respective starting material powders (where the particle size of each material was the same as in Example 1) were mixed in the proportion as shown in Table 1, and baked under the conditions also shown therein. Each of the baked powder was treated at 750° C. for 5 hours in air to remove carbon. Results are also shown in Table 1.

As will be apparent from the foregoing descriptions, it is possible according to this invention to prepare aluminum nitride powder having small particle size and small particle size distribution and also having a uniform shape of particles, at a lower temperature and in a shorter period of time.

Moreover, it is readily possible to prepare a powder having the compositional variety by optionally varying the kind and amount of the additive(s). For example, the baked powder is obtained as aluminum nitride powder if aluminum nitride only is used as the additive, or a starting material for a product called "sialon" can be prepared if silicon carbide and silicon nitride are mixed in a predetermined amount.

TABLE 1

| | Starting material powder (part by weight) | | | | Baking conditions | | | Characteristics | | |
|---|---|---|---|---|---|---|---|---|---|---|
| | Aluminum hydroxide | Carbon black | Additive Kind | Additive Amount | Temp. (°C.) | Time (hr) | Atm. | Mean particle size ($\mu$m) | Particle size distribution ($\mu$m) | Constitutional phase |
| Example No. | | | | | | | | | | |
| 1 | 1 | 0.4 | AlN | 0.1 | 1500 | 5 | $N_2$ | 0.6 | 1.2–0.4 | AlN |
| 2 | 1 | 0.8 | SiC | 0.5 | 1450 | 5 | $N_2$ | 0.5 | 1.1–0.4 | AlN, AlN—SiC |
| 3 | 1 | 1 | AlN | 0.5 | 1500 | 5 | $N_2$ | 0.6 | 1.2–0.4 | AlN |
| 4 | 1 | 1 | AlN | 1 | 1500 | 5 | $N_2$ | 0.6 | 1.2–0.4 | AlN |
| 5 | 1 | 1 | SiC | 0.5 | 1500 | 5 | $N_2$ | 0.5 | 1.1–0.4 | AlN, AlN—SiC |
| 6 | 1 | 2 | AlN | 0.5 | 1450 | 5 | $N_2$ | 0.5 | 1.1–0.4 | AlN |
| 7 | 1 | 0.6 | AlN | 0.7 | 1500 | 5 | $N_2$ | 0.9 | 1.4–0.6 | AlN |
| 8 | 1 | 2 | SiC | 0.5 | 1500 | 5 | $N_2$ | 0.5 | 1.1–0.4 | AlN, AlN—SiC |
| Comparative | | | | | | | | | | |
| 1 | 1 | 1 | — | — | 1500 | 5 | $N_2$ | 3.3 | 5.3–1.9 | AlN |
| 2 | 1 | 1 | AlN | 0.002 | 1500 | 5 | $N_2$ | 2.1 | 3.1–1.0 | AlN |
| 3 | 1 | 1 | AlN | 2 | 1500 | 5 | $N_2$ | 0.5 | 1.1–0.4 | AlN (*1) |
| 4 | 1 | 1 | AlN | 0.5 | 1900 | 1 | $N_2$ | 2.2 | 3.0–1.2 | AlN |
| 5 | 1 | 1 | AlN | 0.5 | 1200 | 10 | $N_2$ | 0.6 | 1.2–0.4 | AlN, $Al_2O_3$ (*2) |

(*1) yield was decreased,
(*2) unreacted

We claim:

1. A process for preparing aluminum nitride powder, which comprises mixing (i) aluminum hydroxide powder, (ii) carbon powder or a substance capable of forming carbon powder by heating and (iii) at least one of additives selected from the group consisting of aluminum nitride powder, silicon nitride powder, silicon carbide powder and powder of substances capable of forming the powder corresponding to these powders, and baking the mixture thus obtained in a non-oxidative atmosphere containing nitrogen.

2. The process according to claim 1, wherein said carbon powder and said at least one additive are mixed in amounts of 0.2 to 2.0 parts by weight and 0.005 to 1.0 part by weight, respectively, based on 1 part by weight of said aluminum hydroxide powder.

3. The process according to claim 1, wherein said mixture is baked at a temperature of from 1300° to 1850° C.

4. The process according to claim 1, wherein said carbon powder has a particle size of 0.5 $\mu$m or less and said additive, 1.0 $\mu$m or less.

5. The process according to claim 1, wherein said aluminum hydroxide powder has a particle size of 20 to 1.0 $\mu$m.

6. The process according to claim 1, wherein said additive has a particle size of 3.0 $\mu$m or less.

7. The process according to claim 1, wherein said mixture is baked for 2 to 20 hours.

8. The process according to claim 1, further comprising the step of baking the baked product at a temperature of from about 600° to 800° C. in an oxidative atmosphere to remove remaining carbon.

* * * * *